Sept. 22, 1942.   H. F. BRANSTETTER ET AL   2,296,700
RETAIL MARKETING DEVICE
Filed June 26, 1940
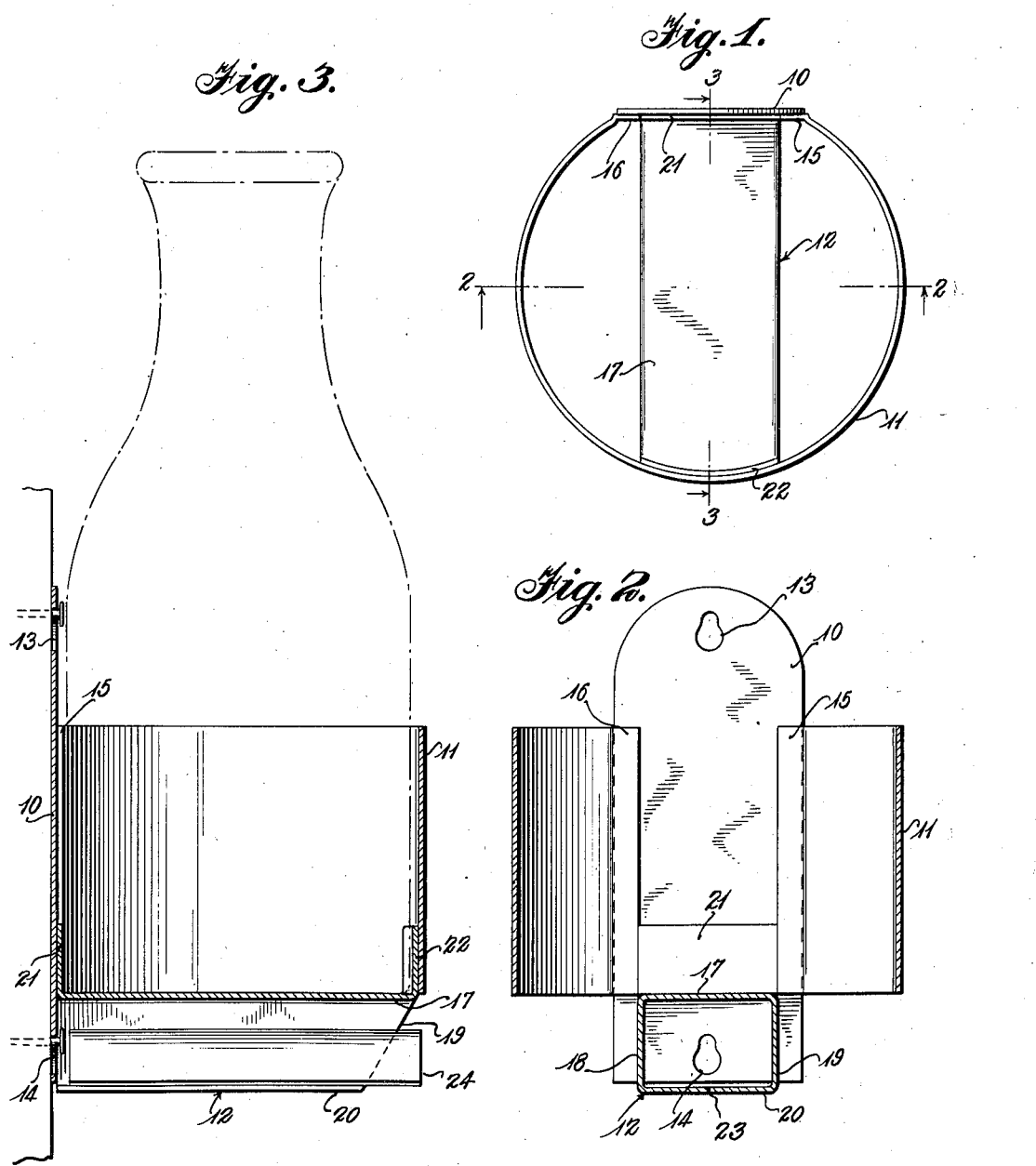
Inventors
Herman F. Branstetter
and Bertha W. Branstetter
By Stevens and Davis
Attorneys Patented Sept. 22, 1942

2,296,700

UNITED STATES PATENT OFFICE 2,296,700

RETAIL MARKETING DEVICE

Herman F. Branstetter and Bertha W. Branstetter, Hendersonville, N. C.

Application June 26, 1940, Serial No. 342,586

2 Claims. (Cl. 232—41)

This invention relates to marketing devices and more particularly to such devices for use in conjunction with the retail merchandizing of dairy products. This application is a continuation-in-part of Herman F. Branstetter et al. application Serial Number 294,976, filed September 14, 1939.

In the retail sale of milk, it is now customary for a delivery agent to make door-to-door deliveries leaving the milk at the customer's house, and, at the same time, collecting any empty receptacles left at the point of delivery by the customer. Ordinarily, the receptacles, which are usually bottles, whether empty and intended for return to the dairy, or full and intended for the customer, are merely set on a convenient level surface near the door of the customer's dwelling. However, when so positioned, containers are likely to be upset or otherwise disturbed by prowling domestic pets or by heavy winds, in either case the result being frequent breakage of bottles and consequent loss of their contents.

Aside from the foregoing, a problem that is continually presented in conjunction with the retail sale of dairy products arises as an incident to the augmentation or other modification of standing orders. Generally, the customer effects an order change by leaving a note in the empty milk bottle advising the delivery agent of the desired modification of the usual order. This note, when placed in the top of a receptacle, is completely exposed to the elements and may be blown away resulting in disappointment to the customer and incident embarrassment to the dairy, or may be rendered illegible because of the action of rain thereupon.

In some parts of the country it has been proposed, in order to expedite the sale of dairy products, to sell books of tickets, each ticket having a specified exchange value for dairy products. A discount can be allowed to purchasers of an entire book of tickets, this being accomplished by setting an exchange value for each ticket in excess of its cost when purchased in book lots. The system, of course, has also the advantage of considerably reducing collection difficulties and bookkeeping costs. However, since the tickets used in the purchase of dairy products marketed according to this scheme are left with the empty milk bottle for collection by the delivery agent, the same difficulty as that encountered in conjunction with order modifications has arisen, namely, the tickets being susceptible to the action of natural forces are either destroyed or lost before the appointed time for delivery of the product and collection of the ticket.

It is therefore an object of this invention to overcome all of the foregoing difficulties and to further the retail marketing of dairy products in an efficient manner.

It is within the contemplation of this invention to wholly protect delivery receptacles from accidental displacement whether the receptacle be full or empty, and, at the same time, to provide for the protection of any written memoranda in conjunction with the sale whether this be data relating to orders or tickets having exchange value as regards the products sold.

The present invention includes an easily assembled device of good appearance and low cost to accomplish the protection of the marketed product as well as any memoranda incident to the sale thereof.

Other objects and advantages of the invention will be apparent from a consideration of the following detailed description of a preferred embodiment thereof in connection with the annexed drawing wherein:

Figure 1 is a top plan view of the device;

Figure 2 is a view in section taken along the line 2—2 of Figure 1; and

Figure 3 is a view in section taken along the line 3—3 of Figure 1.

Referring to the drawing in greater detail, the device shown consists of three parts, an attaching plate 10, a generally cylindrical member 11 and a box 12.

As will be seen upon reference to Figure 2 of the drawings, attaching plate 10 is flat and generally rectangular in configuration. Openings 13 and 14 are provided therein so that the device as a whole may be supported from a generally vertical surface, it being necessary only to pass the larger portion of openings 13 and 14 over the heads of supporting nails or screws and thereafter permitting the device to shift by action of gravity so that the shank of the attaching member will lie within the smaller portions of openings 13 and 14.

Cylindrical member 11 is a rectangular sheet of metal deformed into substantially cylindrical shape, the free ends of the sheet being soldered or otherwise attached to plate 10 at 15 and 16. Ordinarily, the area defined by member 11 and a portion of plate 10 will be of a diameter sufficient to accommodate a milk bottle of conventional design.

Underlying member 11 is box 12 which is formed of a generally cross-shaped blank. The blank when folded comprises a box having defining walls 17, 18 19 and 20. Box wall 17 is of a length slightly in excess of the diameter of the generally cylindrical member 11. This additional length is represented by flanges 21 and 22. Flange 21 is bent upwardly and soldered or otherwise attached to attaching plate 10 while flange 22 is similarly bent and attached to cylindrical member 11 at a point diametrically opposite the point of attachment of flange 21. Walls 18 and 19 extend downwardly at right angles to side 17 while side 20 is composed of the ends of the blank attached at 23, side 20 being parallel to side 17.

It will be noted that side 20 is of a length less than the diameter of cylindrical member 11 and that the forward edges of walls 18 and 19 are bevelled to extend in a straight line between long wall 17 and short wall 20. By this arrangement, a ticket or memorandum placed within box 12 will be readily removable and at the same time is protected from wind and rain. The delivery agent may grasp the protruding end 24 of a ticket as disclosed in Figure 3.

As far as the defining walls 17, 18, 19 and 20 are concerned, box 12 is open at both ends. However, because of the position of the box with regard to attachment plate 10, that plate will function as a wall at the rear end of the box.

Wall 17 of box 12 functions as a bottom support for any container placed within cylindrical member 11. Since wall 17 underlies only a part of the area surrounded by member 11 it will be clear that drainage of condensation or other liquids which may be present on the outside of a container such as a milk bottle may be accomplished while at the same time the bottle is adequately supported and the written memoranda in the box is protected. As an additional protection for the interior of box 12 against water, seam 23 is located in the bottom wall 20 rather than in the top or side walls.

While a specific form of the invention has been shown and described, it will be recognized that many modifications thereof are possible within the scope of the invention as defined in the following claims.

What is claimed is:

1. A retail marketing device for dairy products and the like comprising, means for attachment to a vertical surface, means cooperating with a portion of said first-named means adapted to gird a container or the like, and a box adapted to contain written memoranda, one of the defining walls of said box being attached to the means for attachment to a vertical surface and extending therefrom at a right angle to underlie only a portion of the girded area, said wall being attached also to said second-named means at a point diametrically opposite the point of attachment to the first-named means.

2. A retail marketing device for dairy products and the like comprising, means for attachment to a vertical surface, means cooperating with a portion of said first-named means adapted to gird a container or the like, and a box adapted to contain written memoranda, one of the defining walls of said box being attached to the means for attachment to a vertical surface and extending therefrom at a right angle to underlie only a portion of the girded area, said wall being attached also to said second-named means at a point diametrically opposite the point of attachment to the first-named means, another of the defining walls of said box underlying and extending parallel to said attached wall for a distance less than the length of said attached wall.

HERMAN F. BRANSTETTER.
BERTHA W. BRANSTETTER.